United States Patent
Bloch et al.

[15] 3,635,679
[45] Jan. 18, 1972

[54] METAL ION DETECTING MEMBRANE

[72] Inventors: Rene Bloch, Savion, Israel; Robert Bauer, Bristol; Ben F. Phillips, Elkhart, both of Ind.

[73] Assignee: Miles Laboratories, Inc., Elkhart, Ind.

[22] Filed: Nov. 20, 1969

[21] Appl. No.: 878,544

[52] U.S. Cl. ........................................23/230 R, 23/253 TP
[51] Int. Cl. ..................................................G01n 33/00
[58] Field of Search..................23/253 TP, 230; 195/103.5, 195/127

[56] References Cited

UNITED STATES PATENTS

| 2,452,036 | 10/1948 | Clardy | 23/253 TP X |
| 3,027,239 | 3/1962 | Clark | 23/230 |
| 3,121,613 | 2/1964 | Bittner | 23/230 |
| 3,261,668 | 7/1966 | Natelson | 23/253 TP |
| 3,329,486 | 7/1967 | Rupe | 23/253 TP |
| 3,411,887 | 11/1968 | Ku | 23/253 TP X |
| 3,420,205 | 1/1969 | Morison | 23/253 TP X |

FOREIGN PATENTS OR APPLICATIONS

| 659,059 | 3/1963 | Canada | 195/63 |

*Primary Examiner*—Joseph Scovronek
*Attorney*—Joseph C. Schwalbach, Michael A. Kondzella, Louis E. Davidson and Harry T. Stephenson

[57] ABSTRACT

Metal ions can be determined colorimetrically by using a semipermeable polymeric membrane containing a chelating agent and a solvent therefor, which chelating agent changes color upon contact with the metal ions being determined.

9 Claims, No Drawings

METAL ION DETECTING MEMBRANE

BACKGROUND OF THE INVENTION

This invention relates to the determination of polyvalent metal ions. In one of its more particular aspects this invention relates to membranes which can be used to determine metal ions in solution.

Various methods are known for the determination of metal ions in solution. The most widely used of these methods are color reactions which are more or less specific for particular metal ions. The use of most color reactions, however, involves the preparation of reagents and other laboratory procedures which may be cumbersome and difficult, especially for laboratories staffed with relatively unskilled personnel or for use in the field.

SUMMARY OF THE INVENTION

It has been found that immobilizing a chelating agent and using it in the solid phase provides a convenient means for the determination of metal ions in solution. To immobilize the chelating agent it is dissolved in a suitable solvent and incorporated into a semipermeable polymeric matrix. The polymeric matrix containing the dissolved chelating agent is then cast in the form of a membrane. The membrane may be plasticized by means of a plasticizer added to the polymeric matrix or the solvent for the chelating agent may serve as a plasticizer for the membrane. The resulting membrane containing the chelating agent and solvent and/or plasticizer can be used to give a colorimetric response to various polyvalent metal ions in solution including iron, cobalt, nickel, copper, lead and mercury.

The materials which can be used as the polymeric matrix in the form of a membrane include ethyl cellulose, polyvinyl chloride, cellulose acetate and collodion. Such materials are known to be permeable to small particles, such as water and metallic ions and impermeable to larger molecules such as polymeric species.

As plasticizer for the membrane containing the chelating agent any ester of a polybasic acid including phosphate esters and esters of polycarboxylic acids and polyalkanol esters which are compatible with the polymeric matrix material can be used as well as other conventional plasticizers such as halogenated paraffins. Typical of such ester plasticizer materials are tributyl phosphate tricresyl phosphate, dibutyl adipate, dibutyl sebacate, diisobutyl acetate, dibutyl phthalate, dipentyl phthalate, triethyl citrate and glyceryl tripropionate. The plasticizer can be used in a ration of plasticizer to polymeric matrix of about from 1:3 to about 6:1 depending upon the desired reaction and diffusion rates and mechanical properties. Although reaction rates are higher with higher proportions of plasticizer, membrane strength is thereby reduced. A proportion of about from 4:1 to 5:1 satisfies both criteria and is preferred.

As chelating agent there can be used any of a wide variety of materials which chelate metal ions and which undergo a color change in the presence of the metal ion being chelated. Such chelating agents include thenoyltrifluoroacetone, diphenylthiocarbazone (dithizone), gallocyanine, dimethylglyoxime and ethylene glycol tetraacetic acid.

Any organic solvent which effectively places the chelating agent in solution in the membrane or in the plasticized membrane can be used to advantage. In general any of the materials suitable for use as plasticizer can be used as a solvent for the chelating agent as well, thereby serving the dual function of solvent and plasticizer. Nonplasticizing solvents which can be used include alcohols, ketones such as acetone and methyl ethyl ketone, ethyl acetate and halogenated hydrocarbons such as chloroform, carbon tetrachloride and chlorobenzene.

In order to prepare the membranes of this invention the polymeric matrix material, solvent and chelating agent, with plasticizer if desired, are mixed together and cast upon a suitable relatively impervious surface such as a glass, wood, plastic or metal plate. Upon drying, usually at a temperature of about from 40° to 105° C. for a period of time of about from 5 minutes to 1 hour, the film of polymeric matrix material containing chelating agent is available in the form of a polymeric membrane which can be used with a paper, glass, plastic or other suitable backing or without such backing as desired. When contacted with solutions containing polyvalent metal ions chelatable by the chelating agent in such membrane, the membrane color will change, producing a readily observable indication of the presence of such metal ions. Quantitation can be provided by observation of the degree of color change, such as by visual comparison with a previously prepared color chart or use of a spectrophotometer.

DESCRIPTION OF THE PREFERRED EMBODIMENTS

Example 1

To 60 ml. of freshly distilled cyclohexanone were added 5 g. of polyvinyl chloride. The mixture was rapidly slurried and heat was applied until all particles were dissolved. The resulting solution was then cooled to 25° C. and brought to a volume of 100 ml. by adding cyclohexanone.

A 0.75 percent solution of dithizone in dipentyl phthalate (1 ml.) and 2 ml. of dipentyl phthalate were then added to 20 ml. of the above solution of polyvinyl chloride in cyclohexanone.

The composite solution resulting was then poured upon glass microscope slides and dried at 60 ° C. for 40 minutes to yield a green colored membrane.

The green membrane when dipped into a $10^{-6}$ M solution of lead nitrate changed to a red color. Higher concentrations of lead salts caused the color to become darker.

Example 2

The procedure of example 1 was repeated using 60 ml. of polyvinyl chloride solution and glyceryl tripropionate instead of dipentyl phthalate as the solvent for the dithizone (1 ml.) and no additional plasticizer.

The results were similar to those obtained in example 1.

Example 3

The procedure of example 1 was repeated using 15 ml. of polyvinyl chloride solution and dibutyl adipate as the solvent for the dithizone (1 ml.) and also as added plasticizer (3.25 ml.).

The results were similar to those obtained in example 1.

Example 4

To a 10 percent solution of ethyl cellulose in acetone was added thenoyltrifluoroacetone (10 percent).

Films were prepared by pouring 3 ml. of the resulting solution upon porcelain plates and drying at 105° C. for 5 minutes.

The resulting membrane which was light amber in color was placed in a 0.5 M $CuCl_2$ solution for 15 seconds and removed and blotted dry. The amber-colored membrane turned green upon contacting the solution of cupric ions. Treatment of the membrane with ferric ions ($FeCl_3$) resulted in a reddish color.

Example 5

A mixture of 2 g. polyvinyl chloride, 6 ml. tributyl phosphate and 2 g. thenoyltrifluoroacetone was slurried and poured upon a porcelain plate at 100° C.

Small pieces of the resulting amber-colored film were dipped into solutions of 0.5 M $CuCl_2$ and 0.5 M $FeCl_3$ for 2 seconds. The $CuCl_2$ produced a color change to greenish yellow and the $FeCl_3$ a deep rust color.

Example 6

A mixture of 10 ml. of a 5 percent solution of polyvinyl chloride in cyclohexanone, 0.75 ml. of a 0.5 percent solution of dithizone in tricresyl phosphate and 0.75 ml. tricresyl phosphate was poured upon a porcelain plate and dried in air in an oven at 60° C. for 45 minutes. The resulting green film was placed in a solution of 0.1 M Pb(NO$_3$)$_2$ in 0.1 M NaC$_2$H$_3$O$_2$ at pH and turned orange within 5 minutes.

Example 7

The procedure of example 6 was repeated except that thenoyltrifluoroacetone was substituted for dithizone and tributyl phosphate was substituted for tricresyl phosphate (1.0 ml. of a 5 percent solution of thenoyltrifluoroacetone in tributyl phosphate plus 0.5 ml. tributyl phosphate). The results were similar to those obtained in example 6.

Example 8

A mixture of 20 ml. of a 10 percent solution of polyvinyl chloride in cyclohexanone, 3 ml. of a 1 percent solution of dithizone in tributyl phosphate and 3 ml. of tributyl phosphate was poured onto a glass plate and dried in air in an oven at 40° C. for 15 hours. The resulting film was placed in a solution of 0.001 M Pb (NO$_3$)$_2$ for 5 minutes in NaC$_2$H$_3$O$_2$ buffer at pH 6 and a color change from green to reddish brown was observed.

Example 9

The procedure of example 8 was followed except that the film was cast on water. The results were the same as observed in example 8.

Example 10

The procedure of example 1 was followed except that triethyl citrate was used in place of dipentyl phthalate. The results were similar to those obtained in example 1.

Example 11

The procedure of example 1 was repeated except that dibutyl sebacate was used in place of dipentyl phthalate. The results were similar to those obtained in example 1.

We claim:

1. A membrane for use in the determination of polyvalent metal ions which comprises
    a semipermeable polymeric matrix
    a chelating agent capable for forming colored complexes with the metal ions being determined and
    a solvent for said chelating agent,
    said chelating agent and solvent being contained as a solution within said matrix.
2. A membrane as in claim 1 wherein said solvent is a plasticizer.
3. A membrane according to claim 1 wherein the metal ions are selected from the group consisting of iron, cobalt, nickel, copper, lead and mercury and the chelating agent is selected from the group consisting of thenoyltrifluoroacetone, diphenylthiocarbazone, gallocyanine, dimethylglyoxime and ethylene glycol tetraacetic acid.
4. A membrane according to claim 1 wherein the semipermeable polymeric matrix is selected from the group consisting of ethyl cellulose, polyvinyl chloride, cellulose acetate and collodion.
5. A membrane according to claim 2 wherein the plasticizer is selected from the group consisting of tributyl phosphate, tricresyl phosphate, dibutyl adipate, dibutyl sebacate, diisobutyl azelate, dibutyl phthalate, dipentyl phthalate, triethyl citrate and glyceryl tripropionate.
6. A method for determining polyvalent metal ions in solution which comprises contacting a membrane according to claim 1 with a solution containing the polyvalent metal ions being determined and observing any resulting color change in said membrane.
7. A method according to claim 6 wherein the color resulting from said color change is compared with a previously prepared color chart.
8. A method according to claim 6 wherein the color resulting from said color change is observed by means of a spectrophotometer.
9. A membrane as in claim 1 which additionally contains a plasticizer.

* * * * *

PO-1050
(5/69)

UNITED STATES PATENT OFFICE
CERTIFICATE OF CORRECTION

Patent No. 3,635,679    Dated January 18, 1972

Inventor(s) Rene Bloch, Robert Bauer and Ben F. Phillips

It is certified that error appears in the above-identified patent and that said Letters Patent are hereby corrected as shown below:

Column 3 - line 2       Third word should read -- pH 6 --
                        rather than "pH"

Signed and sealed this 13th day of June 1972.

(SEAL)
Attest:

EDWARD M. FLETCHER, JR.                ROBERT GOTTSCHALK
Attesting Officer                      Commissioner of Patents 1g